(12) United States Patent
Wayman et al.

(10) Patent No.: US 10,942,083 B2
(45) Date of Patent: Mar. 9, 2021

(54) SYSTEM AND METHOD FOR THE PREDICTION OF LEAKAGE IN A PIPELINE

(71) Applicant: Advanced Engineering Solutions Ltd., Cramlington (GB)

(72) Inventors: Malcolm Wayman, Cramlington (GB); Richard J. Treece, Cramlington (GB)

(73) Assignee: Advanced Engineering Solutions Ltd, Cramlington (GB)

( * ) Notice: Subject to any disclaimer, the term of this patent is extended or adjusted under 35 U.S.C. 154(b) by 309 days.

(21) Appl. No.: 15/577,444

(22) PCT Filed: May 25, 2016

(86) PCT No.: PCT/GB2016/051505
§ 371 (c)(1),
(2) Date: Nov. 28, 2017

(87) PCT Pub. No.: WO2016/189299
PCT Pub. Date: Dec. 1, 2016

(65) Prior Publication Data
US 2018/0149552 A1 May 31, 2018

(30) Foreign Application Priority Data
May 28, 2015 (GB) ...................................... 1509169

(51) Int. Cl.
*G01M 3/28* (2006.01)
*G01N 27/87* (2006.01)
(Continued)

(52) U.S. Cl.
CPC .......... *G01M 3/2815* (2013.01); *G01M 3/243* (2013.01); *G01M 3/40* (2013.01);
(Continued)

(58) Field of Classification Search
CPC ...... G01M 3/2815; G01M 3/243; G01M 3/40; G01N 27/82; G01N 27/87; G01N 17/006
(Continued)

(56) References Cited

U.S. PATENT DOCUMENTS 1,979,912 A * 11/1934 Campbell ................ G01B 5/28
33/836
7,523,666 B2  4/2009 Thompson et al.
(Continued)

FOREIGN PATENT DOCUMENTS

GB          2460484 B       3/2011
WO       2015055995 A2      4/2015

*Primary Examiner* — Robert R Raevis
(74) *Attorney, Agent, or Firm* — Gable Gotwals

(57) ABSTRACT

This invention relates to a method for assessing the condition of at least a portion of a pipeline to predict the possibility of occurrence of leakage from the pipeline. The method includes the steps of identifying at least one portion of the pipeline to be assessed, undertaking an assessment of the wall of the portion to identify defects located thereon and the assessment includes identifying the depth, width and length of identified defects and including reference to a value for the pressure of the fluid passing through the pipeline portion. This allows the condition of the pipeline at the portions of the same which are most critical to be identified and this is used to provide an indication of the pipeline as a whole without the need to investigate the entire pipeline.

8 Claims, 6 Drawing Sheets

Figure 2A:
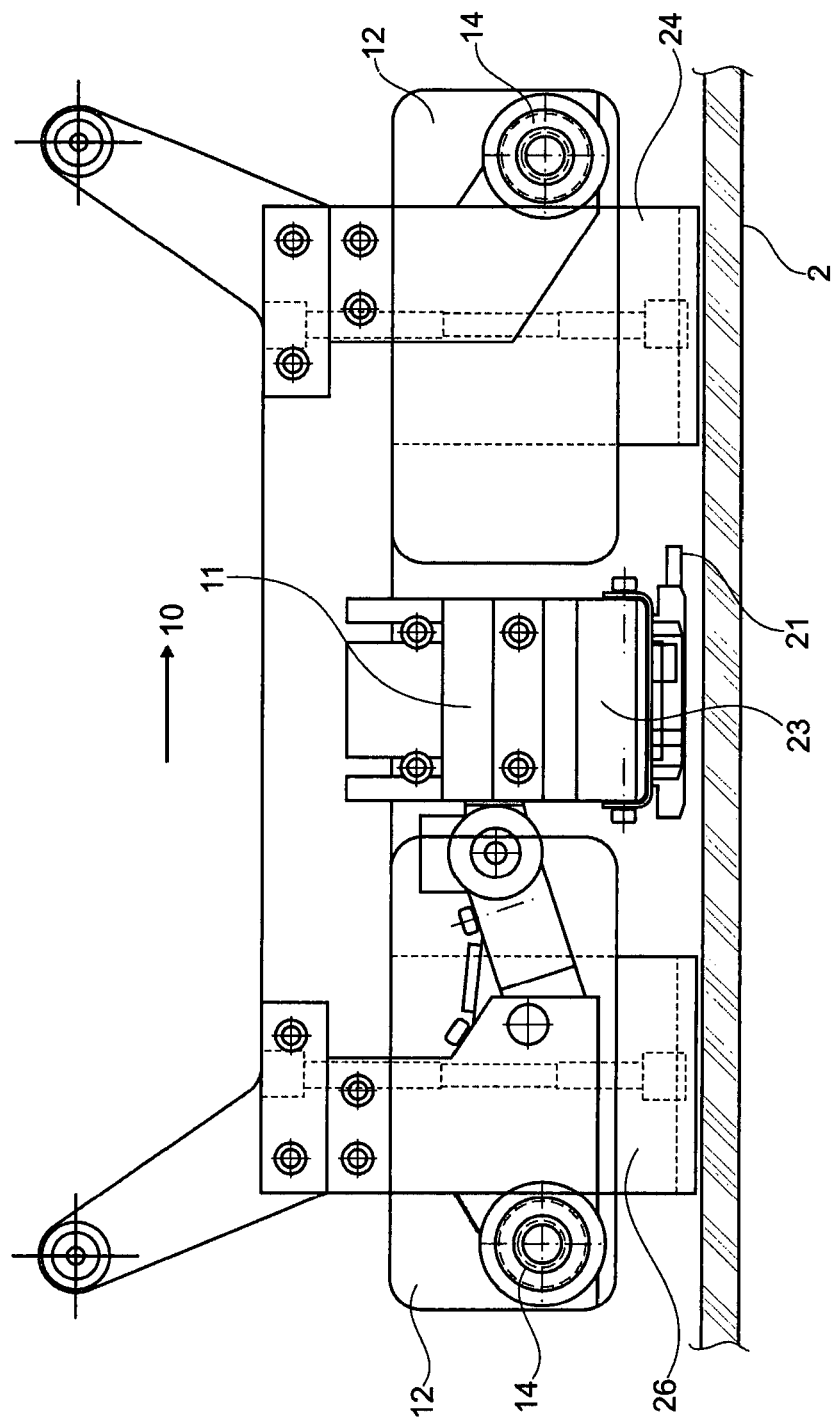

(51) Int. Cl.
*G01N 27/82* (2006.01)
*G01N 17/00* (2006.01)
*G01M 3/24* (2006.01)
*G01M 3/40* (2006.01)

(52) U.S. Cl.
CPC ........... *G01N 17/006* (2013.01); *G01N 27/82* (2013.01); *G01N 27/87* (2013.01)

(58) Field of Classification Search
USPC ........ 73/40, 40.5, 49.1, 865.9, 865.8, 432.1, 73/592; 340/540, 603, 605; 324/207.22, 324/207.23, 226, 227, 228, 229, 234–243, 324/262
See application file for complete search history.

(56) References Cited

U.S. PATENT DOCUMENTS

| | | |
|---|---|---|
| 2009/0229362 A1 | 9/2009 | Tomar et al. |
| 2014/0165731 A1 | 6/2014 | Linford |

* cited by examiner

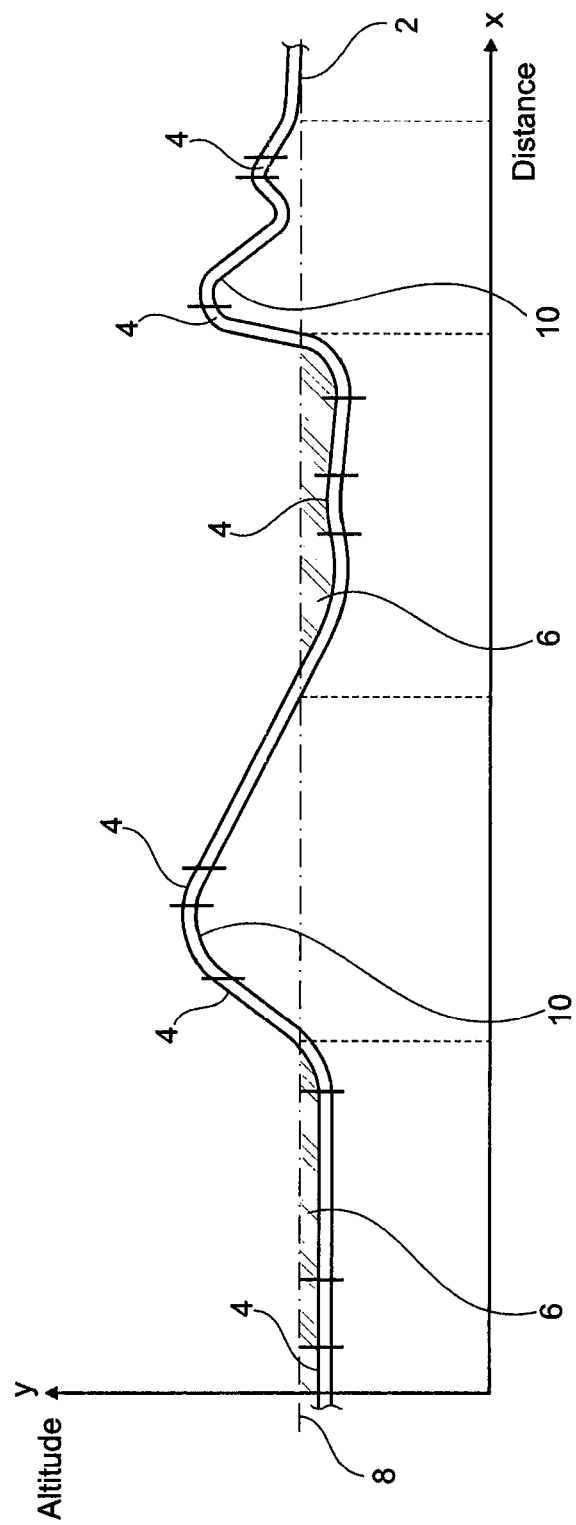

| TABLE 4.2 COATING FAILURE DISTRIBUTION - PERCENTAGE COATING FAILURE ON EAST PIPE SECTION | | | | | | | | | | | |
|---|---|---|---|---|---|---|---|---|---|---|---|
| | Axial Distance from Datum Point (mm) | | | | | | | | | | % Coating failure per circumferential location |
| | 0-100 | 100-200 | 200-300 | 300-400 | 400-500 | 500-600 | 600-700 | 700-800 | 800-900 | 900-1000 | |
| A | 30 | 40 | 50 | 50 | 40 | 40 | 60 | 50 | 30 | 60 | 45 |
| B | 30 | 40 | 40 | 50 | 50 | 50 | 60 | 30 | 40 | 50 | 44 |
| C | 30 | 50 | 60 | 50 | 50 | 70 | 60 | 50 | 40 | 50 | 51 |
| D | 40 | 40 | 40 | 60 | 60 | 60 | 70 | 60 | 50 | 50 | 53 |
| E | 40 | 60 | 60 | 50 | 70 | 60 | 60 | 40 | 60 | 60 | 57 |
| F | 40 | 40 | 50 | 50 | 50 | 70 | 70 | 80 | 60 | 50 | 56 |
| G | 40 | 50 | 50 | 50 | 60 | 60 | 60 | 80 | 70 | 60 | 58 |
| H | 40 | 30 | 30 | 30 | 20 | 30 | 20 | 20 | 20 | 20 | 26 |
| I | 20 | 20 | 20 | 20 | 10 | 10 | 10 | 20 | 10 | 10 | 15 |
| J | 70 | 60 | 50 | 70 | 70 | 50 | 40 | 40 | 40 | 50 | 49 |
| % Coating failure per axial location | 38 | 43 | 45 | 49 | 48 | 50 | 51 | 47 | 42 | 41 | |
| Overall area of coating failure (%) | | | | | | | | | | | 45.4 |
| Total Cells Analysed | | | | | | | | | | | 100 |

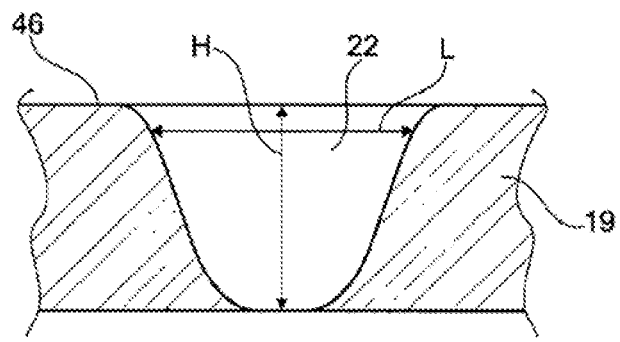
Fig. 4a
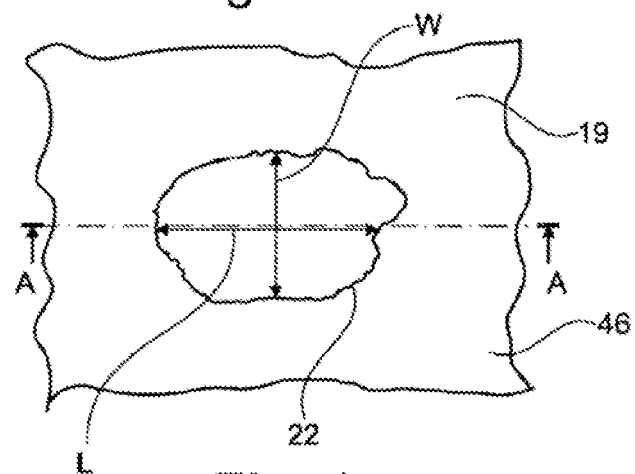
Fig. 4b
Fig. 4c

SYSTEM AND METHOD FOR THE PREDICTION OF LEAKAGE IN A PIPELINE

CROSS-REFERENCE TO RELATED APPLICATIONS

This application is the United States National Phase of Patent Application No. PCT/GB2016/051505 filed 25 May 2016, which claims priority to British Patent Application No. 1509169.7 filed 28 May 2015 each of which are incorporated herein by reference.

BACKGROUND OF THE INVENTION

The invention to which the application relates is with regard to the detection and prediction of leakage due to corrosion in a pipeline and, in particular, to the ability to predict the possibility of leakage occurring in the pipeline at that time and/or in the future following the analysis of one or more portions of the pipeline.

It is known from the applicant's patent GB2460484 to undertake the analysis of portions of a pipeline and to use the results of that analysis to then predict certain condition parameters of the pipeline at that time and over time in the future and thereby provide an indication of the repair and maintenance work which may be required. This can be performed without the need to analyse all of the length of the pipeline and without the need to excavate the pipeline length.

At present, the analysis in the known system is of the pitting or other defects in the pipeline portion which is being assessed the portion is split into a number of cells and the deepest pitting in each cell is identified. The value of the deepest pit in each cell is then used in the subsequent analysis of the pipeline portion and the results are extrapolated to the pipeline as a whole. Other features such as the soil in which the pipeline is located and the condition of any coating which is provided around the external surface of the pipeline can also be taken into account. This system is used to determine the likelihood of pipe wall defects passing through from one, external, side of the pipeline wall to the other, internal, side of the pipeline wall and which defects are referred to as "through-wall" defects, or defects which nearly pass through the whole wall and which are referred to as "close to through-wall" defects. The system is also used to determine the likelihood of fracture of the pipeline but cannot be used to determine the likelihood of leakage from the pipeline which can occur before the fracture of the pipeline and which therefore could, ideally, be additionally detected and dealt with so as to allow repair steps to be performed on the leakage.

Thus, while the known methodology has been found to be extremely effective, the use of the same can be limited, especially in certain types or uses of pipeline and one type is that in which the probability of leakage occurring from the pipeline at the time of assessment or over time is of critical importance. This is particularly, although not exclusively, relevant to pipelines used in the water industry and yet further in relation to mains water supply pipelines where leakage can be a significant problem and a problem which at present cannot be easily identified without the need to excavate and analyse the entire length of the pipeline which is difficult to achieve in many geographical locations and is prohibitively expensive due to the need to excavate the pipeline length or use an alternative system such as the use of acoustic measurement technology in order to identify leaks, but this system still requires access, in this case to the interior of the pipeline, at relatively short intervals. Indeed these difficulties and the expense means that, in practice, many pipelines are simply not analysed or checked at present until failure actually occurs and at which point remedial action is required on an urgent basis. Acoustic identification of the leakage becomes more difficult as the pipe diameter increases since the distance along the pipeline which the noise travels reduces with pipe diameter.

If the sections of pipeline which are actually leaking could be identified, then the use of acoustic leakage detection becomes more economic and viable. Currently, only the presence and depth of defects within the pipeline wall and defects deep enough to potentially pass through the pipeline wall are predicted.

The aim of the present invention is therefore to provide a system and method to allow the analysis and comparison of the possibility of leakage occurring in sections of a pipeline to be undertaken and performed in order to enable the possibility of leakage occurring in the pipeline to be determined and predicted without the need for the entire length of the pipeline to be investigated to detect leakage and therefore allow the analysis to be performed.

In a first aspect of the invention there is provided a method of assessing the condition of at least a portion of a pipeline to predict the possibility of occurrence of leakage from the pipeline, said method comprising the steps of identifying at least one portion of the pipeline to be assessed, undertaking an assessment of the wall of said portion to identify defects located thereon, wherein said assessment includes identifying the depth, width and length of identified defects and analysing the condition of the portion with respect to the identified defects and the method further includes identifying values for the pressure of the fluid passing along the said pipeline and using these values in combination with the assessment of identified defects to identify those parts of the pipeline at which leakage is most likely to occur.

Typically the method allows the identification and sizing of defects which may be large enough to allow leakage by predicting the area of a through-wall or close to through-wall defect rather than only the depth of the defect.

In one embodiment the portions of the pipeline which are selected for analysis are those which have similar estimated corrosion levels with the estimation, in one embodiment, being made on the basis of consideration of any or any combination of soil maps along the route of the pipeline, soil properties along the route of the pipeline and/or the condition of the coating of the pipeline.

Typically the likelihood of leakage is based on the predicted area of through-wall and potentially through-wall defects, in conjunction with the pressure of the fluid such as water or effluent in the pipeline and which is acting on these defects.

Thus, for the portions in which the defect analysis has been performed, the maximum expected area of the largest pitting defect is predicted and with this information the minimum fluid pressure in the pipeline which would cause a leak from this defect area can then be calculated.

Typically the actual pressure of the fluid in the pipeline varies along their route due to variations in height or proximity to the pump. Some water pipelines can be pumped in one direction (towards storage) and driven by a static head. Thus, given the predicted defect level and the predicted locations of the higher fluid pressure lengths of the pipeline so those sections of the pipeline which have a fluid pressure which is high enough to cause leakage to occur at the predicted defect levels can be identified.

In one embodiment correlator or other acoustic listening processes can then be used on only the identified sections which have been identified as having an increased likelihood of leakage.

In one embodiment the width of the defect is assumed to be equivalent to the diameter of the defect.

Typically the volume of the identified defect is calculated and in one embodiment is repeated for each identified defect.

Typically, when identifying the portion or portions of the pipeline which are to be checked, at least part of the decision is made with reference to the predicted corrosion along the pipeline and portions with similar predicted corrosion are selected.

Typically, part of the method is the preparation of a pressure profile of the pipeline so as to be able to identify those parts of the pipeline at which the pressure of the fluid is at its greatest and thereby identify those parts which are the most prone to leakage if there are defects therein. Furthermore, the parts of the pipeline at which the pressure of the fluid is lower and below a threshold level may be disregarded with regard to predicting the possibility of leakage occurring. This is because the pressure level is insufficient to cause corrosion products in the identified defects from being "blown out" to thereby allow leakage through the particular defects which have been identified, and typically with respect to the worst defect which has been identified in the analysis of the portions of the pipeline.

Typically this means that some parts, in some cases many kilometres of pipeline, need not be tested, and the portions of the pipeline which are assessed are selected to be those portions of the pipeline where defects are most likely to occur.

Typically the parts of the pipeline at which the pressure of the pipeline is greater will be those geographically located at the lower sections of the pipeline and/or closest to pumps.

By identifying the pressure of the fluid and the volume of the relevant defects, so the effective leakage stress levels on the pipeline portions at that time and in the future can be identified. Typically part of the prediction will also determine the likelihood of a fracture of the pipeline occurring and the timescale for that fracture to occur and the pressure of the fluid can also be taken into account for that analysis.

Defects of less depth than through pipeline wall defects can initiate fracture depending in pipe material properties and stress levels such as pressure and external loads.

In one embodiment, in addition to determining whether leakage is likely to occur due to the presence of the defects, a prediction is made with regard to the flow rate through the one or more leakages which are predicted to occur.

Typically, based on this analysis, a decision can be made as to whether the level of predicted leakage is within an acceptable tolerance level, in which case no remedial work is required or may be delayed, or, if the level of leakage is deemed to be too great then a remedial work schedule can be developed and followed at that time and/or in the future so as to prevent or restrict the leakage.

The remedial work performed typically initially involves the use of an acoustic leak detection technique over the sections identified as likely to have leakage, in order to locate the sites of leakage.

In one embodiment the apparatus used to determine the number, depth and width of the defects includes a triaxial array of sensors which determine the value of magnetic flux in the pipeline wall at each location and at least one proximity sensor which identifies whether an identified defect is at the external or internal surface of the pipeline wall.

In one embodiment the apparatus which is used is that which is described in the applicant's patent U.S. Pat. No. 7,523,666 and co-pending application GB1318096.3, and the contents of the same are incorporated herein.

In one embodiment the analysis of the type set out in the applicant's patent GB2460484 will be performed and the analysis to identify the volume of certain defects is performed to provide the prediction of leakage in accordance with the invention. In one embodiment this includes the calculation of the volume of those defects which are identified as passing through the wall or nearly passing through the wall.

In one embodiment, the defects which are identified are first assessed with respect to the wall thickness and a decision reached as to whether the defect passes through the wall completely, or to within a predefined distance, of the interior or exterior face of the pipeline. In one embodiment, those defects which are identified as passing through the wall or are close to the interior or exterior pipeline face are those which are then assessed to identify the width and/or length of the same.

Typically, in the assessment of the likelihood of leakage to occur in the future, reference is made to previously assessed pipelines of similar material and/or with similar fluid pressures typically utilising one or more algorithms, in order to predict the speed of deterioration of the pipeline condition and hence likelihood of leakage in the future.

In one embodiment the assessment of the likelihood of leakage is performed in combination with the assessment of the likelihood of fracture of the pipeline.

In a further embodiment the statistical distribution of the identified defects in the pipeline portion is taken into account.

In a further aspect of the invention there is provided a method of assessing the condition of at least a portion of a pipeline to predict the possibility of occurrence of leakage from the pipeline, said method comprising the steps of identifying at least one portion of the pipeline to be assessed, identifying defects which pass through, or substantially through, the pipeline wall, wherein the said depth, width and length of the identified defects is identified by measuring a magnetic flux induced into the pipeline at said portion, and reaching a decision on the possibility of leakage based on the measured defect and the said pressure of fluid passing through said pipeline portion.

In one embodiment the method includes the step of analysing the pipeline to determine the part or parts of the pipeline at which the pressure of fluid passing therealong is above a threshold level at which leakage can occur with respect to the defects which have been identified.

In accordance with a further aspect of the invention there is provided a method of assessing the condition of at least a portion of a pipeline to predict the possibility of occurrence of leakage from the pipeline, said method comprising the steps of identifying at least one portion of the pipeline to be assessed, undertaking an assessment of the wall of said portion to identify defects located thereon, wherein said assessment includes identifying the depth, width and length of identified defects and the condition of the portion is then analysed with respect to the identified defects in combination with a value for the pressure of the fluid passing through the said pipeline portion.

In accordance with a further aspect of the invention there is provided apparatus for performing the assessment of the defects in the pipeline walls in accordance with the method.

Figure 2B:
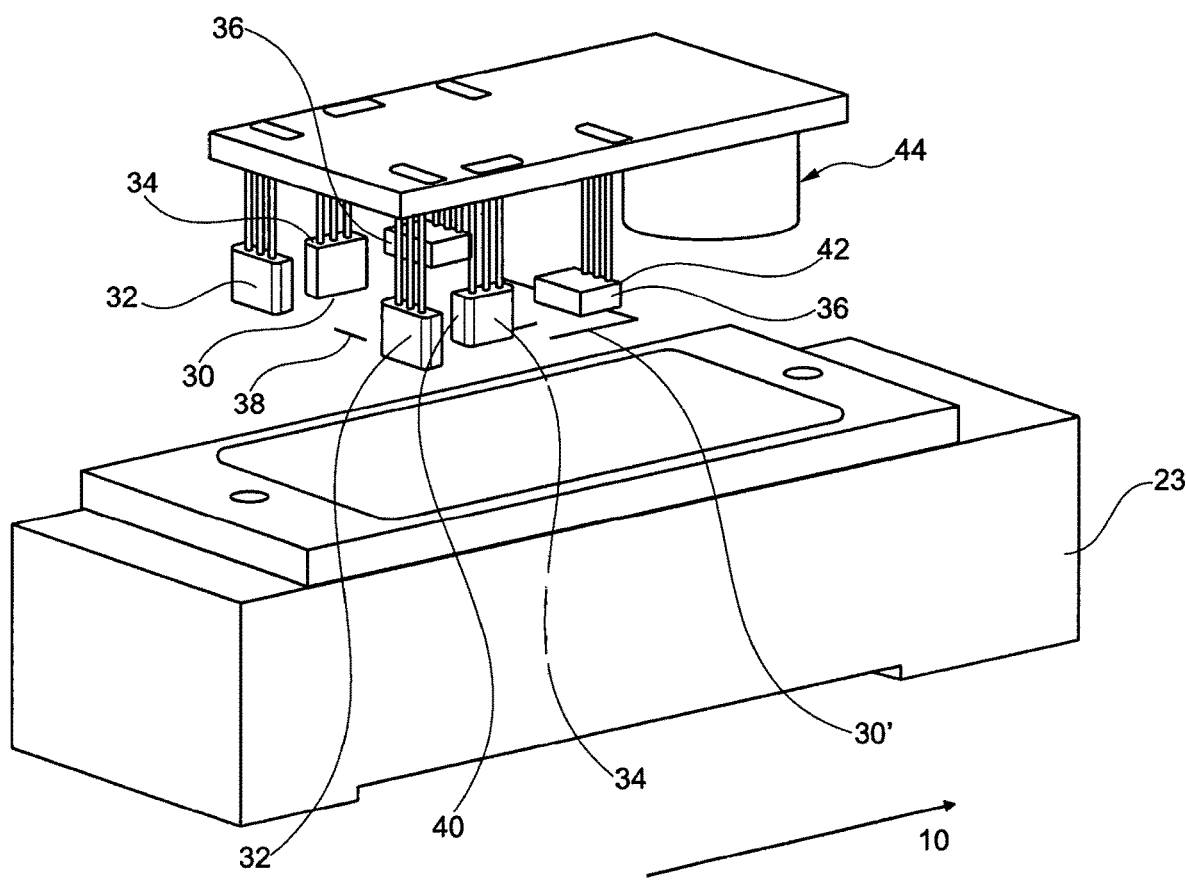
Figure 2C:
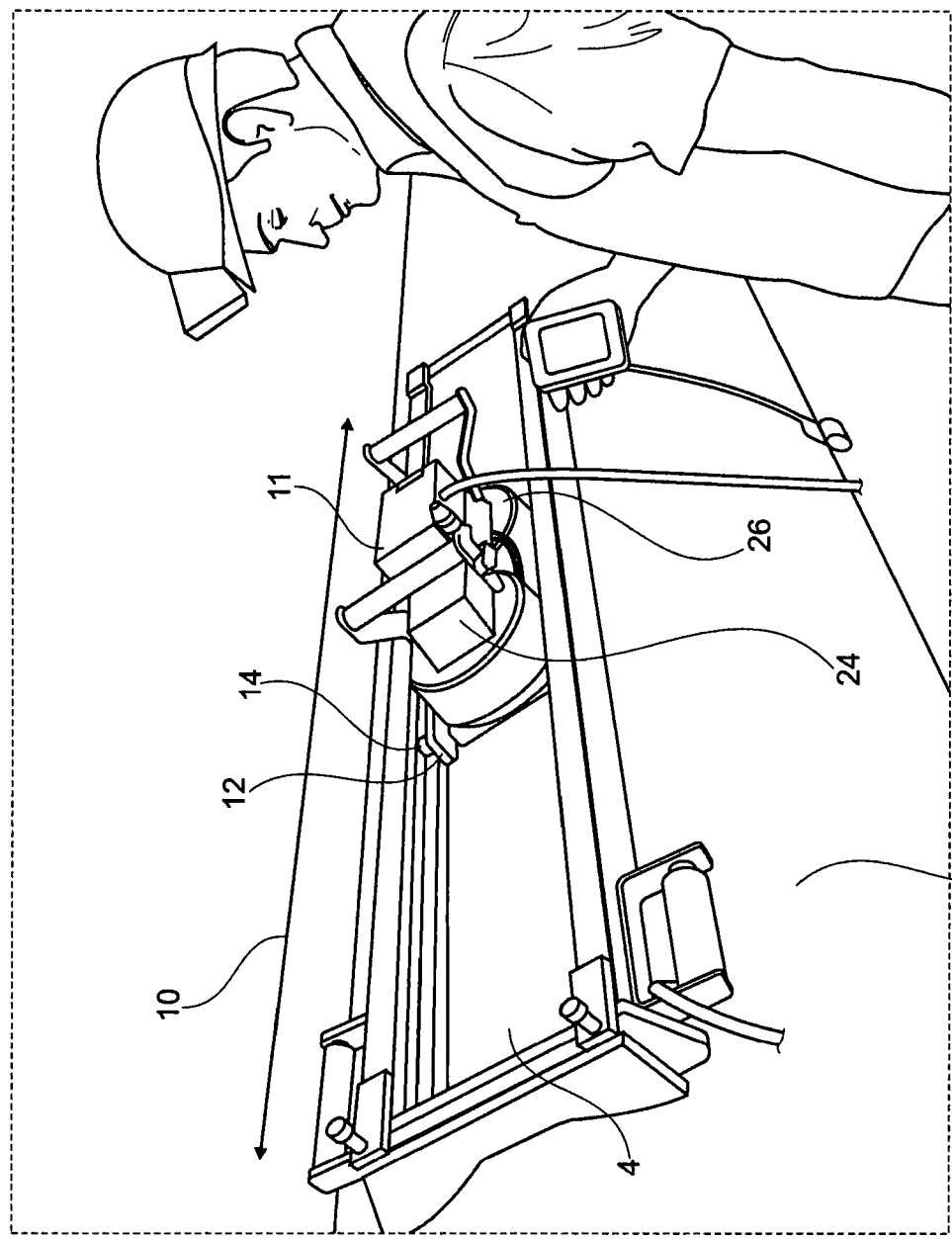
Figures 3A, 3B:
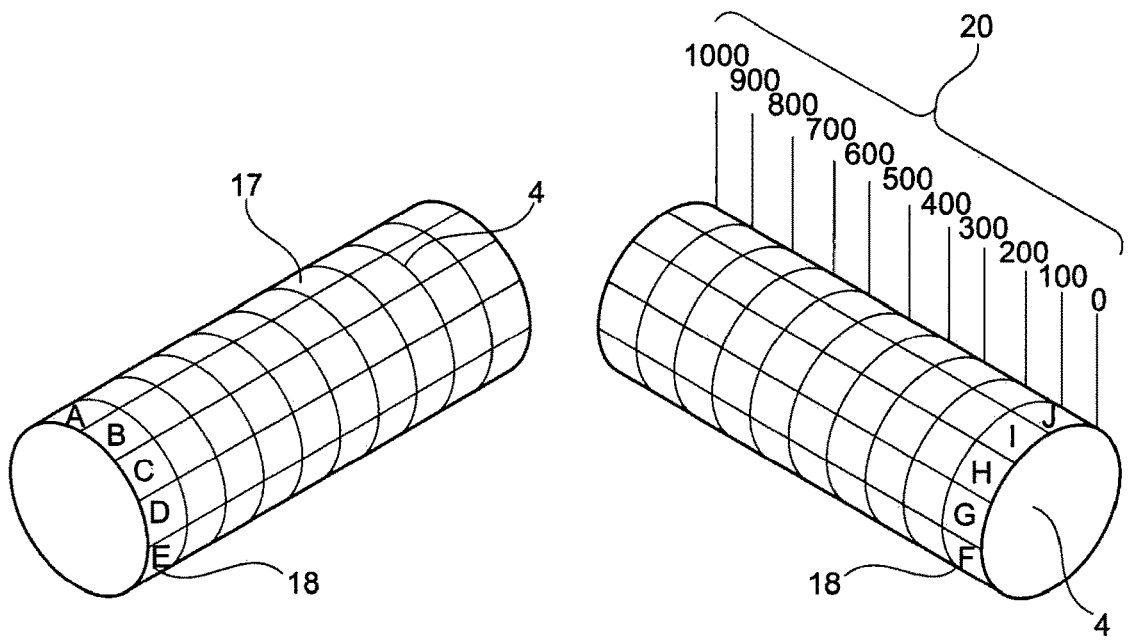

Specific embodiments of the invention are now described with reference to the accompanying drawings wherein FIG. 1 illustrates a length of pipeline which can be assessed in accordance with the invention;

FIGS. 2a-c illustrate one form of assessment apparatus which can be used in accordance with the invention;

FIGS. 3a and b illustrate a method followed using the apparatus of FIGS. 2a and b in assessing the condition of the pipeline wall; and FIGS. 4a-c illustrate a defect of the type of use in accordance with the invention and a grid of possible leakage defects obtained in accordance with the invention.

Referring firstly to FIG. 1 there is illustrated a geographical plot of a length of pipeline 2 which is to be assessed and for which a prediction of it's leakage and/or potential leakage is to be determined. The plot shows the pipeline with regard to the length of the pipeline along the x-axis and the altitude of the pipeline from a datum, such as sea level, along the y-axis. Typically, when, for example, the pipeline is a mains water supply pipeline or effluent pipeline the same can be of a number of kilometres in length and, particularly when the same is formed of metal, the condition of the same will deteriorate over time such that leakage from the pipeline will occur.

In accordance with the invention, at least one, and more typically a number of portions 4 of the pipeline are selected to be assessed. The portions selected are those portions of the pipeline which are deemed likely to have similarities in corrosion levels With the location of the portions 4 which are to be analysed and measured having been determined, then, in accordance with the invention, the condition of the soil in the vicinity of the pipeline portion may be assessed using conventional techniques to take into account any of Redox, Linear Polarisation Resistance (LPR), soil pH, ground type, moisture content and/or heterogeneity in order to determine whether the soil type is the same at each portion location.

If a coating material on the external surface of the same in order to try and protect the pipeline wall from corrosion and the condition of this coating (if provided) may be assessed in accordance with the invention.

FIGS. 2a-c illustrate one form of apparatus which can be used to assess the condition of the pipeline wall portion in terms of leakage. The body 11 of the apparatus is provided with slides 12 which includes a plurality of rollers 14 which engage with a track or frame 26 mounted on the pipeline 2 as shown in FIG. 2c and along which track the body 11 is moved as indicated by arrow 10 so as to perform the analysis of the portion length. The track can then be moved and located round the periphery of the portion to allow the assessment of the portion to be completed.

The body 11 is provided with a sensing means 21 mounted in advance of the same with regard to the direction of movement and this sensing means, typically a Gaussmeter, detects whether or not the pipeline wall 2 is saturated with magnetic flux and monitors that this maintained as the body is moved along the pipeline wall so as to ensure the accuracy of the readings is maintained.

The provision of the sensor 21 to measure the pipeline wall magnetic flux saturation allows a feedback loop to be utilised to optimise the required electro-magnetic coil current, based on controlling the level of the air-coupled flux running parallel to the pipe wall. The sensor 21 is mounted in a non ferrous cover directly in front of the inspection head 23 of the apparatus which detects changes in the magnetic flux and at the appropriate orientation to measure the air coupled flux running parallel to the pipeline wall.

The body includes two shoes 24,26 for inducing the magnetic field from one of the shoes 24 into the pipeline wall and then back through the shoe 26. Typically the shoes are connected to electromagnets provided in the apparatus which allow the magnetic field to be induced and typically the dimension of the shoes are such as to be substantially the same width as the electromagnets so as to reduce any air flux influence.

FIG. 2b illustrates two sensor arrays 30, 30' which are provided within the body 11 and at the inspection head 23. The sensors provided in each array are typically Hall effect sensors, which allow the detection of the magnetic flux in the pipeline wall which underlies the inspection head 23 and detects changes in the same in order to allow the data therefrom to be used to indicate the presence of defects in the pipeline wall. In this example of the apparatus, each sensor array 30 includes three Hall sensors, 32,34,36 with the respective longitudinal axes 38, 40,42 of the sensors in each array arranged at a 90 degrees offset with respect to the other sensors in the array in order to allow a three dimensional array of data signals to be received from the combination of sensors in each sensor array.

The three dimensional data signals which are received from the sensors in each array are then used to determine the width, depth and length of the detected defects. A proximity sensor 44 is also provided and this allows the determination of whether the defect detected by the sensors array 30 is located on the exterior or interior of the pipeline wall as if the condition of the proximity sensor changes then the defect is deemed to be at the external surface of the pipeline wall and if the defect is identified by the sensor array as being present but the proximity sensor condition does not change then the defect is determined to be internal or at the internal face of the pipeline wall. In either case the data from the sensors in the sensor array can be used to determined, the length, width and depth of the defect.

In one embodiment each pipeline portion 4 can be graphically represented by a grid 16 and FIGS. 3a-b illustrates how this grid is mapped around the periphery of the pipeline portion 4. Each cell 17 of the grid 16 is provided with a coordinate 18 relating to the position round the circumference of the pipeline and a coordinate 20 relating to the position along the length of the pipeline. For example the cell 17 shown by the reference arrows has the co-ordinates B800-900 on the grid 16. The size of the grid can be selected to suit the pipeline portion in question as can the size of area of the pipeline represented by each of the cells. In one embodiment the width of the portion is equivalent to the length of pipeline which can be measured by monitoring apparatus without having to move the apparatus as a whole along the pipeline portion.

In accordance with the method of the invention, for the defects which are identified, an assessment is performed to identify which defects have a depth which means that the defect passes through the wall of the pipeline or is of a depth which means that the defect will deteriorate over a period of time such that it will pass through the pipeline wall and hence allow leakage to occur. An example of such a defect 22, most typically a "pit" in the pipeline wall, is shown in plan in FIG. 4C and in cross section of the pipeline wall 19 of the portion 4 along line A-A in FIG. 4a. The identified pit defect 22 is identified which passes from the external wall 46 of the pipeline to the internal wall 48 and is therefore classed as a through-wall defect of the type which can cause leakage. In accordance with the invention the depth H, Length L and also the width W of the defect is known so that the volume of the defect can be calculated.

The statistical analysis based on area or volume material loss will identify the patterns and size of pitting defects.

The number of portions 4 which are inspected along the length of the pipeline is typically influenced by the need to identify and measure at least a minimum number of statistically valid number of pitting occurrences. For each cell where there is pitting only one pitting occurrence in that cell counts as a defect.

The predictions for leakage to occur and the calculation of the critical pressure can be made by using statistical analysis, typically utilising suitable algorithms into which the measured data can be input as appropriate. In addition to the measured data other reference data and/or data from previous pipeline measurements which are applicable to the current pipeline being measured may be selectively obtained from a reference database and used as required in the algorithms in order to provide an accurate and reliable prediction for the whole of the pipeline length to which the assessment is being applied rather than just the portions which have been measured.

In one embodiment all of the identified defects, including those which are through-wall or near through-wall defects 22 which are those which are relevant for the purposes of leakage analysis in accordance with the invention, are mapped onto a grid as shown in FIG. 4b.

For these identified defects 22 the volume of the same is calculated and the largest defect identified. With this defect known, so the critical pressure of the fluid in the pipeline which would cause leakage to occur through the largest pitting defect is calculated.

With reference to FIG. 1 it is known that the pressure of the fluid varies along the length of the pipeline and that the relevant height of the parts of the pipeline along its length can be one factor. Thus, those parts 6 of the pipeline which are at lower altitude locations on the pipeline are assessed with reference to a fluid pressure profile of pressure of the liquid passing along the pipeline at those parts and typically the pressure of the fluid passing along the pipeline is most likely to be above the calculated and predetermined critical pressure level which represented by the line 8. Thus these parts 6 are identified as being those parts of the pipeline in which leakage is most likely to occur. The remaining parts 10 of the pipeline are deemed not to be required to be assessed for leakage using correlators or other acoustic techniques as part of the method as, if leakage is to occur, it will occur first in one of the parts 6 of the pipeline where the fluid pressure is greater and at or above the critical pressure value.

This therefore means that large parts 10 of the length of the pipeline do not need to be assessed and so immediately the cost of providing a useable and accurate pipeline assessment is reduced in contrast to conventional methodology. The parts 6 of the pipeline where leakage is most likely to occur are therefore identified and, in turn, these portions of the pipeline are subject to leakage surveys and/or remedial works can then be performed on the same or a remedial action plan can be developed which causes remedial works to be performed over a longer time period to prevent the predicted leakage with the remedial works being carried out on those identified portions rather than the overall pipeline as if the pipeline is to have leakage the leakage will occur first at the identified portions if the remedial work is not performed. This allows the condition of the pipeline at the portions of the same which are most critical to be identified and this is used to provide an indication of the pipeline as a whole without the need for the costs and time required to investigate the entire pipeline.

The invention claimed is:

1. A method of assessing a condition of at least one portion of a pipeline to predict a possibility of occurrence of leakage from and fracture of the pipeline, said method comprising the steps of:
identifying portions of the pipeline which have similar estimated corrosion levels with reference to any or any combination of soil maps along a route of the pipeline, soil properties along the route of the pipeline and/or the condition of a coating of the pipeline, when provided,
undertaking an assessment of the wall of said portions to identify defects located thereon using magnetic flux sensors to determine a value of magnetic flux leakage from the pipeline wall and at least one proximity sensor which identifies whether an identified defect is at an external or internal surface of the pipeline wall,
said assessment includes identifying the depth, width and length of identified defects to indicate the condition of the wall of the said portions, and using the assessment of these portions to provide a prediction of the condition for the whole of the pipeline length, identifying a threshold level at which leakage and fracture can occur with respect to the defects which have been identified,
identifying values for pressure of the fluid passing along the said pipeline and wherein the values are used to initially create a pressure profile of the pipeline to identify the lower lying and pump location parts of said pipeline at which the pressure of the fluid passing along the pipeline is predicted to be greater than at other parts of the pipeline, and disregarding those parts of the pipeline at which the pressure of said fluid is predicted to be below the threshold level with respect to predicting the possibility of leakage and fracture occurring and,
in combination with the identified defects data, identifying those of said parts of the pipeline at which leakage and fracture is most likely to occur.

2. A method according to claim 1 wherein the method allows identification and sizing of defects which may be large enough to allow leakage by predicting an area of a through-wall, or close to through-wall defect.

3. A method according to claim 1 wherein remedial work is performed on the said parts of the pipeline which are identified.

4. A method according to claim 1, wherein following the identification of higher fluid pressure parts of pipeline, an acoustic listening apparatus is used on only identified lengths of pipeline.

5. A method according to claim 1, wherein predicting a flow rate through the one or more leakages which are predicted to occur, determining that the level of predicted leakage is not within an acceptable predetermined tolerance level and developing a remedial work schedule.

6. A method according to claim 1, wherein an apparatus used to determine the number, depth and width of the defects includes a triaxial array of sensors which determine a value of magnetic flux leakage from the pipeline wall and at least one proximity sensor which identifies whether an identified defect is at an external or internal surface of the pipeline wall.

7. A method according to claim 1 wherein the defects which are identified in said portions of the pipeline are first assessed with respect to a pipeline wall thickness and a decision reached as to whether the defect passes through the wall completely, or to within a predefined distance, of an interior or exterior face of the pipeline and those defects which do are those which are subsequently assessed to identify width and/or length of the same.

8. A method according to claim 1 wherein reference is made to previously assessed pipelines of similar material and/or with similar fluid pressures.

\* \* \* \* \*